US010941939B2

(12) United States Patent
Graham et al.

(10) Patent No.: US 10,941,939 B2
(45) Date of Patent: Mar. 9, 2021

(54) GAS TURBINE ASSEMBLIES AND METHODS

(71) Applicant: General Electric Company, Schenectady, NY (US)

(72) Inventors: Owen Graham, Niskayuna, NY (US); Kwanwoo Kim, Montgomery, OH (US); Nicholas Magina, Niskayuna, NY (US); Sharath Nagaraja, Niskayuna, NY (US); Fei Han, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 357 days.

(21) Appl. No.: 15/714,118

(22) Filed: Sep. 25, 2017

(65) Prior Publication Data

US 2019/0093891 A1    Mar. 28, 2019

(51) Int. Cl.
*F23R 3/26* (2006.01)
*F23R 3/00* (2006.01)
(Continued)

(52) U.S. Cl.
CPC ............... *F23R 3/26* (2013.01); *F23R 3/002* (2013.01); *F23R 3/04* (2013.01); *F23R 3/10* (2013.01);
(Continued)

(58) Field of Classification Search
CPC .... F23R 3/26; F23R 3/002; F23R 3/04; F23R 3/10; F23R 3/28; F23R 2900/00014;
(Continued)

(56) References Cited

U.S. PATENT DOCUMENTS 2,974,485 A * 3/1961 Schiefer .................... F23R 3/06
60/756
4,881,373 A * 11/1989 Yamaguchi ............... F02K 7/06
60/732
(Continued)

FOREIGN PATENT DOCUMENTS

EP    1517087 B1    6/2012
EP    2837783 A1    2/2015
(Continued)

OTHER PUBLICATIONS

Bothein et al., "A Novel Damping Device for Broadband Attenuation of Low-Frequency Combustion Pulsations in Gas Turbines", Engineering for Gas Turbine and Power, vol. 136, Issue: 4, pp. 9, 2013.
(Continued)

*Primary Examiner* — Arun Goyal
*Assistant Examiner* — Henry Ng
(74) *Attorney, Agent, or Firm* — John P. Darling; The Small Patent Law Group, LLC (57) ABSTRACT

The systems and methods described herein relate to a dome of a gas turbine assembly configured to suppress pressure pulsations. The systems and methods provide a dome having an aperture configured to surround an injector assembly of a combustor. The dome having a front panel extending radially from the aperture. The systems and methods couple a first cavity to the front panel. The first cavity includes a series of ducts. A first duct of the series of ducts is configured to receive airflow into the first cavity from a compressor and a second set of ducts of the series of ducts and a third duct of the series of ducts are configured to direct airflow to the combustor from the first cavity, wherein the third duct has a larger diameter than the second set of ducts.

14 Claims, 11 Drawing Sheets

(51) Int. Cl.
*F23R 3/28* (2006.01)
*F23R 3/04* (2006.01)
*F23R 3/10* (2006.01)
*F02C 7/18* (2006.01)
*F02C 3/04* (2006.01)

(52) U.S. Cl.
CPC ............ *F23R 3/28* (2013.01); *F02C 3/04* (2013.01); *F02C 7/18* (2013.01); *F05D 2220/32* (2013.01); *F05D 2240/35* (2013.01); *F23R 2900/00014* (2013.01); *F23R 2900/00017* (2013.01)

(58) Field of Classification Search
CPC .... F23R 2900/00017; F02C 3/04; F02C 7/18; F05D 2220/32; F05D 2240/35
See application file for complete search history.

(56) References Cited

U.S. PATENT DOCUMENTS

| | | | |
|---|---|---|---|
| 5,956,955 A * | 9/1999 | Schmid | F23R 3/283 60/748 |
| 6,164,058 A | 12/2000 | Doebbeling et al. | |
| 7,857,094 B2 | 12/2010 | MacQuisten et al. | |
| 7,874,159 B2 | 1/2011 | Gerendas et al. | |
| 8,469,141 B2 | 6/2013 | Wang et al. | |
| 8,567,197 B2 | 10/2013 | Mueller et al. | |
| 8,991,185 B2 | 3/2015 | Huber et al. | |
| 9,212,823 B2 | 12/2015 | Boardman et al. | |
| 9,429,042 B2 | 8/2016 | Genin et al. | |
| 9,618,206 B2 | 4/2017 | Genin et al. | |
| 2007/0180829 A1 | 8/2007 | Currin et al. | |
| 2007/0269757 A1 * | 11/2007 | Commaret | F23R 3/10 431/265 |
| 2011/0165527 A1 | 7/2011 | Kim et al. | |
| 2013/0019602 A1 | 1/2013 | Kim et al. | |
| 2013/0042627 A1 | 2/2013 | Gerendas et al. | |
| 2014/0090389 A1 | 4/2014 | Stuttaford et al. | |
| 2015/0377488 A1 | 12/2015 | Elkady et al. | |
| 2016/0076772 A1 | 3/2016 | Metternich et al. | |
| 2016/0161118 A1 | 6/2016 | Tonon et al. | |
| 2016/0177836 A1 | 6/2016 | Wickstrom et al. | |
| 2016/0298841 A1 * | 10/2016 | Papple | F23R 3/005 |
| 2017/0009986 A1 | 1/2017 | Patel et al. | |

FOREIGN PATENT DOCUMENTS

| | | |
|---|---|---|
| EP | 2860449 A1 | 4/2015 |
| EP | 2860451 A1 | 4/2015 |
| JP | 2006138272 A | 6/2006 |

OTHER PUBLICATIONS

Noiray et al., "Theoretical and experimental investigations on damper performance for suppression of thermoacoustic oscillations", Sound and Vibration, vol. 331, Issue: 12, pp. 2753-2763, 2012.

Office Action dated Mar. 23, 2020 in corresponding Chinese Application 2018108205737.

* cited by examiner

GAS TURBINE ASSEMBLIES AND METHODS

STATEMENT REGARDING FEDERALLY SPONSORED RESEARCH OR DEVELOPMENT

The United States Government retains license rights in this invention and the right in limited circumstances to require the patent owner to license others on reasonable terms by the terms of Government Contract No. DTFAWA-15-A-800013.

FIELD

The subject matter described herein relates to a dome of a gas turbine assembly configured to suppress pressure pulsations.

BACKGROUND

A combustor of a conventional gas turbine assembly receives pressure perturbations or pulsations caused by a feedback loop between flow perturbations and unsteady heat release. The pressure pulsations cause structural and flow vibrations, which damage components of the gas turbine assembly. The damage caused by the pressure pulsations reduces a life span of the gas turbine assembly. Conventional methods to reduce the pressure pulsations have focused on determining and eliminating a source of the pressure based on the unsteadiness of the heat release of the gas turbine assembly. However, the conventional methods do not eliminate the pressure fluctuation completely and a direct damping of source pressure or hear release fluctuation is needed.

BRIEF DESCRIPTION

In an embodiment, a system (e.g., gas turbine assembly) is provided. The system includes a dome having an aperture configured to surround an injector assembly for a combustor. The dome having a front panel radially extending from the aperture, and have a first cavity that includes a series of ducts. A first duct of the series of ducts is configured to receive airflow into the first cavity from a compressor, and a second set of ducts of the series of ducts and a third duct of the series of ducts are configured to direct airflow to the combustor from the first cavity. The third duct having a larger diameter than the second set of ducts.

In an embodiment, a method (e.g., for suppressing pressure pulsations of a gas turbine assembly) is provided. The method includes providing a dome having an aperture configured to surround an injector assembly for a combustor. The dome having a front panel extending radially from the aperture. The method includes coupling a first cavity to the front panel. The first cavity includes a series of ducts. A first duct is configured to receive airflow into the first cavity from the compressor. And a second set of ducts that are configured to direct an airflow to reduce a thermal temperature of the dome.

In an embodiment, a system (e.g., gas turbine assembly) is provided. The system includes a front panel radially extending from an aperture that surrounds an injector assembly of the gas turbine assembly. The front panel having first and second cavities with the first cavity having a first set of ducts configured to receive airflow into the first cavity from the compressor. A second set of ducts configured to direct airflow to a combustor. The second cavity having a third duct configured to receive airflow into the second cavity and a fourth duct configured to direct airflow to a combustor. The fourth duct having a diameter larger than the second set of ducts.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The systems and methods described herein relate to a dome of a gas turbine assembly configured to suppress pressure pulsations of a combustor. The dome is interposed between the combustor and the compressor. The dome includes an aperture configured to surround an injector assembly. The injector assembly provides fuel either gaseous and/or liquid fuel and an oxidizer, which produces a flammable mixture of fuel and oxidixer. The dome includes a front panel radially extending from the aperture. The front panel includes one or more cavities, which include a series of ducts. The ducts enable the dome to perform dual functions of shaping and/or containing the reacting flow while also suppressing pressure pulsations generated by the combustor.

For example, a first cavity of the series of ducts receives airflow from the compressor into the cavity. The first cavity includes second and third ducts of the series of ducts. The second ducts are configured to direct a portion of the airflow to reduce a thermal temperature of the dome. For example, the second ducts are configured to direct the airflow to a hot side of the dome, which decreases a temperature of the dome.

In another example, the dome includes first and second cavities. The first and second cavities include different series of ducts. The first cavity includes first and third of the series of ducts, and the second cavity includes second of the series of ducts.

The second and third ducts have different sizes. Optionally, the third ducts have a larger diameter relative to the second cavities. Optionally, a size and/or length of the third ducts and a size of the first cavity configured such that the resonance may be targeted at a frequency range of concern. The frequency range represents pressure peaks of flow vibrations of the combustor. The size and/or length of the third ducts and the size of the first cavity are optimized to dampen the pressure peaks at the frequency ranges. Optionally, the optimization may consider the bias flow level through the cavities. The bias flow corresponds to an amount of air contained, an air pocket, within the first cavity. The increase in the amount of air contained in the first cavity has the dual effect of broadening the acoustic absorption and preventing hot gas ingestion.

At least one technical effect of embodiments described herein include mitigating pressure pulsations, which hamper operability and emission performance. At least one technical effect of embodiments described herein include reducing the impact of a design cycle of the gas turbine assembly. At least one technical effect of embodiments described herein include replacing existing domes of gas turbine assemblies to regain entitlement performances on efficiency and/or emissions. At least one technical effect of embodiments described herein include dual use of bias flow (e.g., airflow) for cooling and acoustic dampening of the dome.

Figure 1:
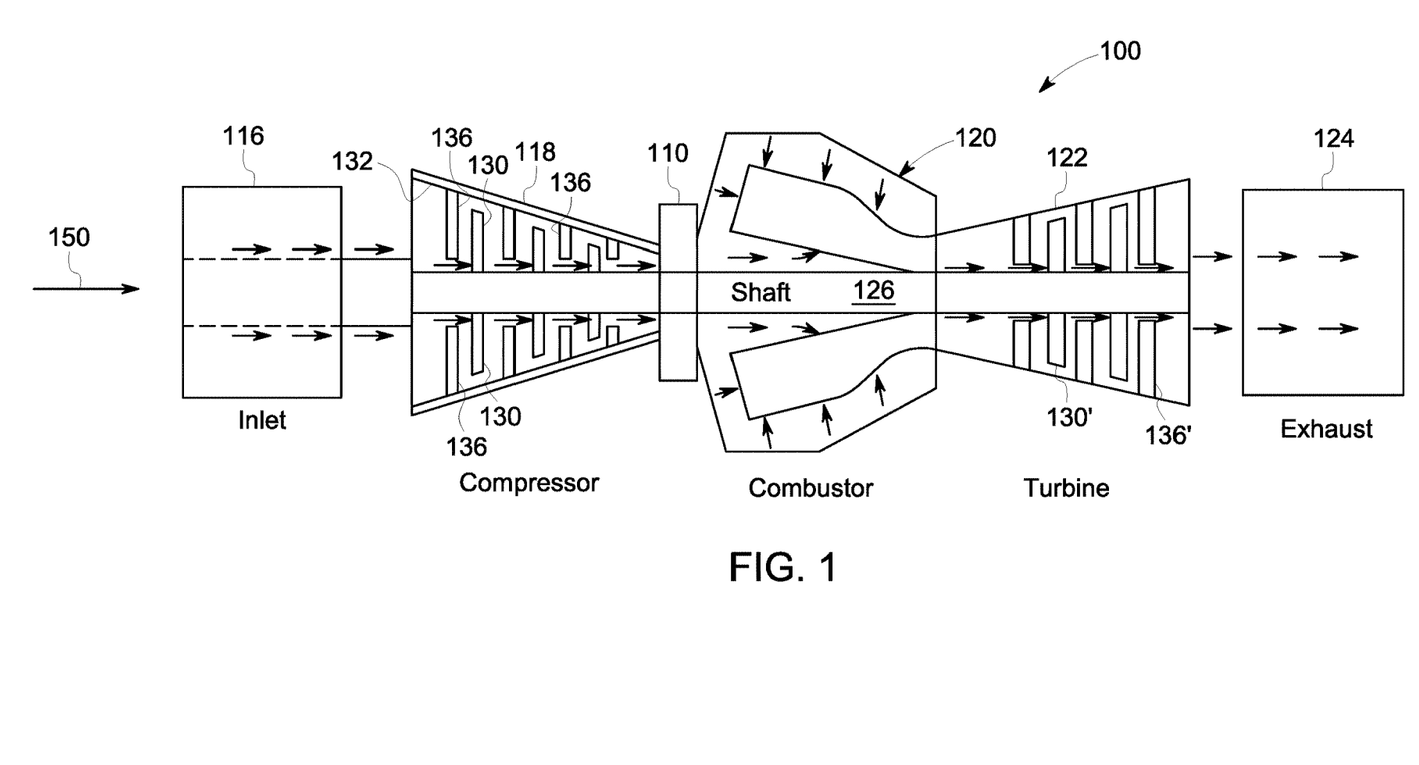
FIG. 1 illustrates an embodiment of a turbine assembly.

FIG. 1 illustrates a turbine assembly 100 in accordance with an embodiment. The turbine assembly 100 includes an inlet 116 through which air enters the turbine assembly 100 in the direction of arrow 150. The air travels in a direction 150 from the inlet 116, through a compressor 118, through a combustor 120, and through a turbine 122 to an exhaust 124. A rotating shaft 126 runs through and is coupled with one or more rotating components of the turbine assembly 100. The compressor 118 compresses incoming air to create a supply of compressed air.

The compressor 118 and the turbine 122 comprise multiple airfoils. The airfoils may be one or more of blades 130, 130' or guide vanes 136, 136'. The blades 130, 130' are axially offset from the guide vanes 136, 136' in the direction 150. The guide vanes 136, 136' are stationary components. The blades 130, 130' are operably coupled with and rotate with the shaft 26.

The combustor 120 burns fuel to produce a high-pressure, high-velocity hot gas, which is received by the turbine 122. The fuel is supplied to the combustor 120 from an injector assembly that includes a fuel nozzle valve. The injector assembly extends through an aperture of the dome 110. The dome 110 is interposed between the compressor 118 and the combustor 120. The fuel nozzle valve extends through the aperture and is coupled to the combustor 120. The fuel nozzle valve is substantially concentrically aligned with respect to the dome 110. The dome 110 includes a mixer within the aperture. The mixer includes a set of vanes, which swirls the fuel with the compressed air from the compressor 118. The mixed fuel and air are delivered by the dome 110 and discharged into the combustor 120.

FIGS. 2-3B, and 5-13 illustrate different embodiments of domes (e.g., the dome 110) for the gas turbine assembly 100. The domes include at least one cavity that receives compressed air from the compressor 118. The at least one cavity provides a cushion, which absorbs the pressure pulsations generated by the compressor 118. The at least one cavity dampens and/or suppresses the pressure pulsations.

Figure 2:
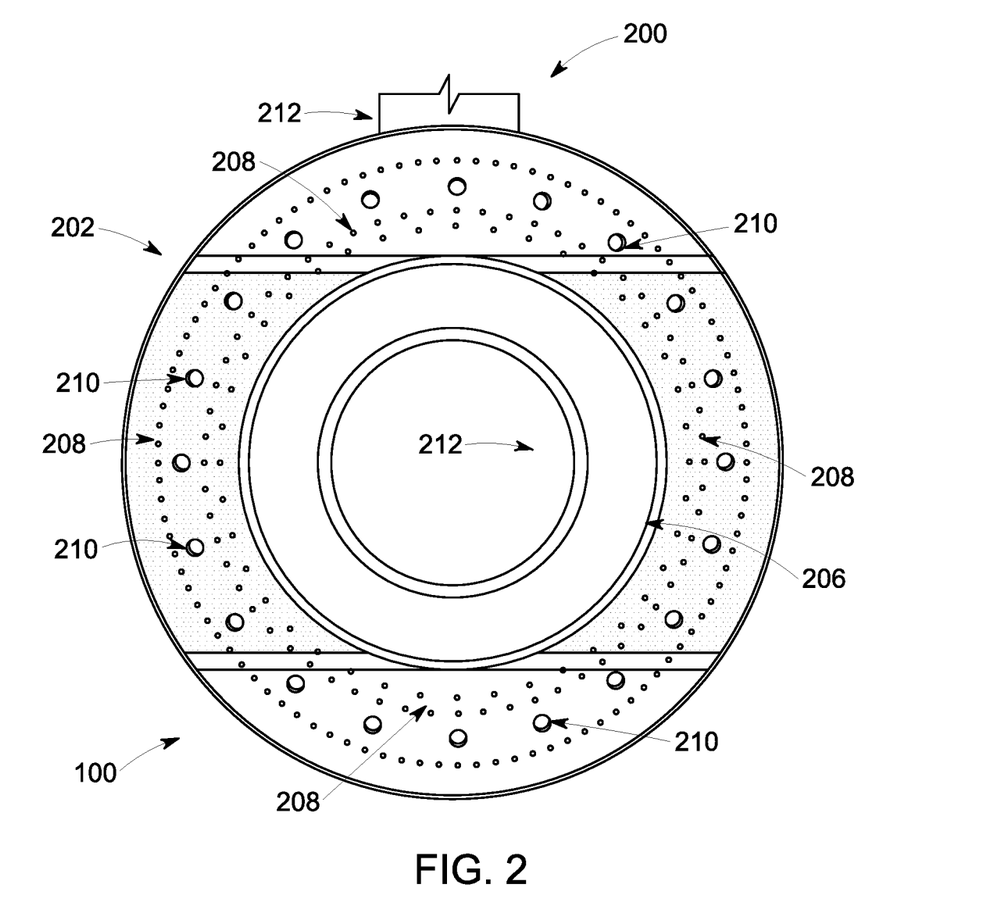
FIG. 2 illustrates a perspective view of an embodiment of a dome.

FIG. 2 illustrates a perspective view of a dome 200, in accordance with an embodiment. The dome 200 includes an aperture 206 configured to surround an injector assembly 212. The injector assembly 212 provides fuel to the combustor 120. For example, the injector assembly 212 extends through the aperture 206. The dome 200 includes a front panel 202 that radially extends from the aperture 206. The front panel 202 includes a series of ducts that extend through the front panel 202, and terminate at a surface of the front panel 202. For example, the front panel 202 includes a second set of ducts 208 and a third set of ducts 210 from the series of ducts. The series of ducts is positioned at different radial positions along the front panel 202. The third set of ducts 210 are shown interposed between the second set of ducts 208. For example, the second set of ducts 208 are at an inner and outer radial position of the front panel 202, which surround the third set of ducts 210. The ducts in the series are configured to have different sizes. For example, a diameter of one of the third set of ducts 210 is larger than the diameter of one of the second set of ducts 208. Additionally or alternatively, a number of ducts of the second set of ducts 208 is greater than a number of ducts of the third set of ducts 210.

Figure 3A:
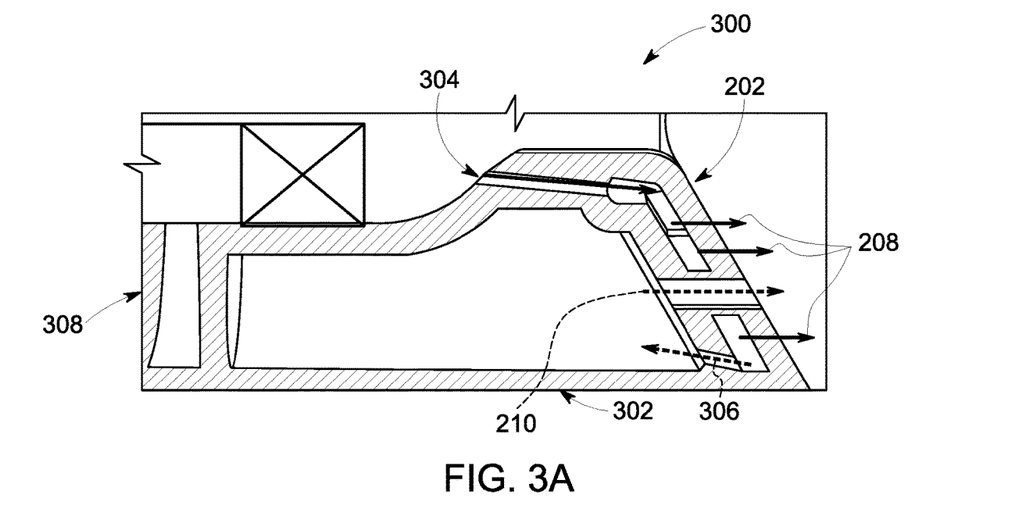
FIG. 3A illustrates a side view of a first cavity of the dome shown in FIG. 2.
Figure 3B:
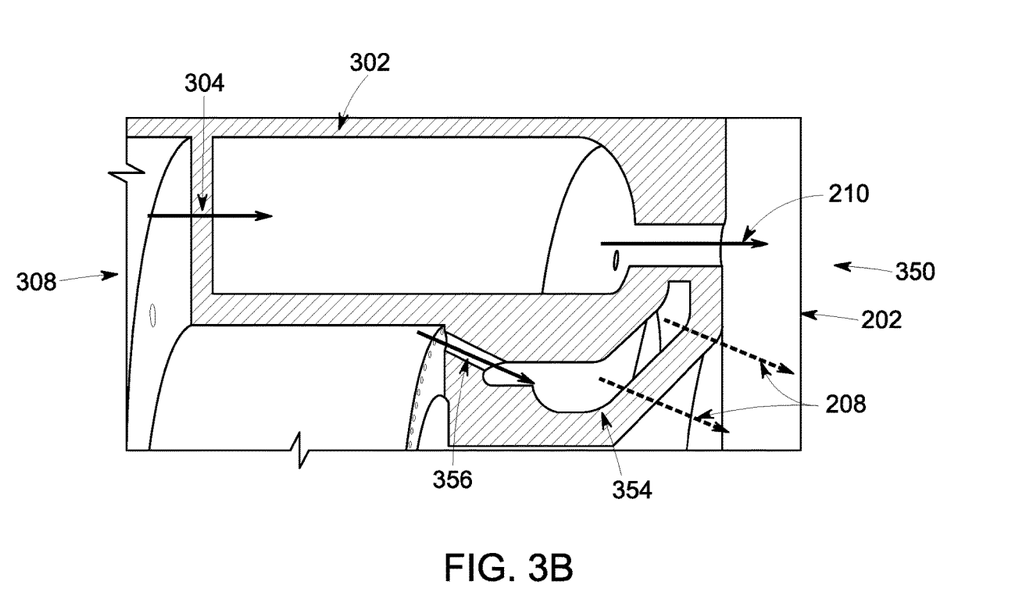
FIG. 3B illustrates a side view of first and second cavities of the dome shown in FIG. 2.

In connection with FIG. 3A-B, the dome 200 includes different embodiments of cavities. FIG. 3A shows the dome 200 having a first cavity 302. The first cavity 302 includes the series of ducts to direct airflow from the compressor 118 to the combustor 120.

FIG. 3A illustrates a side view 300 of the first cavity 302 of the dome 200. The front panel 202 includes a backside 308. The front panel 202 includes the first cavity 302 along the backside 308 of the front panel 202. The first cavity 302 extends along a circumference of the backside 308 of the front panel 202. For example, the first cavity 302 extends along the backside 308 of the front panel 202 to include the series of ducts.

The first cavity 302 includes a first set of ducts 304 of the series of ducts. The first set of ducts 304 are configured to direct airflow received from the compressor 118 into the first cavity 302. A portion of the received airflow is exhausted to the second set of ducts 208. The second set of ducts 208 are configured to direct the portion of the received airflow to reduce a thermal temperature of the dome 200. For example, the second set of ducts 208 are configured to direct the portion of the received airflow to a hot side of the dome 200. The hot side of the dome 200 may correspond to a portion of the dome 200 proximate to the combustor 120.

A remaining portion of the received airflow is directed through a receiving duct 306. The receiving duct 306 is configured to direct the remaining portion of the received airflow into the first cavity 302. For example, the receiving duct 306 provides air into the first cavity 302 to create a pocket of air within the first cavity 302. The pocket of air of the first cavity 302 is configured as a damper to suppress the pressure pulsations generated by the compressor 118.

For example, compressed air is delivered to the combustor 120 through the mixer of the aperture 206. The combustor 120 generates pressure pulsations based on the received compressed air. The pocket of air within the first cavity 302 acts as a cushion, which absorbs the pressure pulsations generated by the compressor 118. For example, the first cavity 302 is configured to absorb the pressure pulsations generated by the combustor 120, and reduce the pressure pulsations of the gas turbine assembly 100.

The first cavity 302 includes the third set of ducts 210. The second set of ducts 208 are positioned about the third set of ducts 210. For example, the second set of ducts 208 are positioned around the third set of ducts 210. The third set of ducts 210 are configured to direct airflow to the combustor 120 from the first cavity 302. For example, the pocket of air is dispersed from the first cavity 302 through the third set of ducts 210 to the combustor 120.

FIG. 3B illustrates a side view 350 of the dome 202 having first and second cavities 302, 354 of the dome 200. The front panel 202 includes the first and second cavities 302, 354 along a backside 308 of the front panel 202. The first and second cavities 302, 354 extend along a circumference of a backside 308 of the front panel 202. The first and second cavities 302, 354 include different series of ducts. The first cavity 302, shown in FIG. 3B, includes a first set of ducts 304 of the series of ducts. The first set of ducts 304 are configured to direct airflow from the compressor 118 into the first cavity 302. The first cavity 302 is configured to provide the pocket of air to dampen or suppress the pressure pulsations generated by the combustor 120. The first cavity 302 includes the third set of ducts 210. The third set of ducts 210 are configured to direct airflow to the combustor 120 from the first cavity 302. For example, the pocket of air is dispersed from the first cavity 302 through the third set of ducts 210 to the combustor 120.

The second cavity 354 includes a fourth set of ducts 356 positioned at the backside 308 of the front panel 202. The fourth set of ducts 356 is configured to receive airflow from the compressor 118 into the second cavity 354. The received airflow is exhausted to the second set of ducts 208. The second set of ducts 208 are configured to direct the received airflow to reduce a thermal temperature of the dome 200. For example, the second set of ducts 208 are configured to direct the received airflow to a hot side of the dome 200. The hot side of the dome 200 may correspond to a portion of the dome 200 proximate to the combustor 120.

Figure 4:
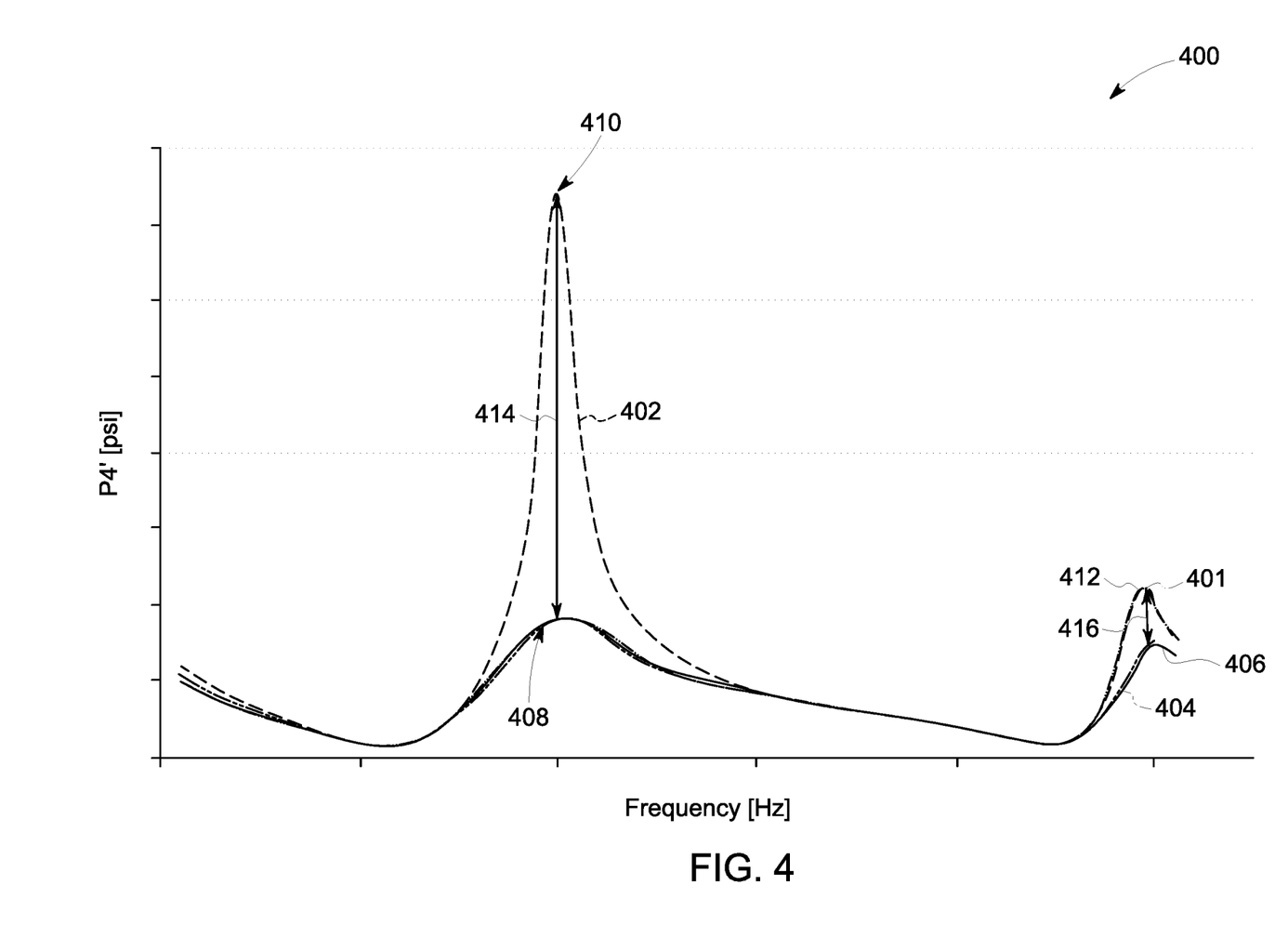
FIG. 4 is a graphical illustration of a pressure pulsation of a conventional gas turbine assembly.

Optionally, volumes of the first cavity 302 and/or the size of the set of third ducts 210 are configured for particular target frequencies. FIG. 4 is a graphical illustration of a pressure spectrum 402 with a conventional dome. For example, the conventional dome does not include the first cavity 302, the third set of ducts 210, and/or the like. The pressure spectrum 402 is shown for different frequencies (e.g., Hz) of a horizontal axis. A vertical axis represents a pressure generated by the combustor 120. The pressure spectrum 402 includes two pressure peaks 410, 412. The pressure peak 410 occurs at a target frequency indicative of a resonance of the combustor 120.

The dome 202 can be configured to reduce an amplitude of the pressure peak 410. For example, the first cavity 302 can be configured to have resonance frequencies to match the target frequency of the pressure spectrum 402 at the pressure peak 410. A volume of the first cavity 302 and/or the size of the set of third ducts 210 of the first cavity 302 can be configured to have a resonance frequency at the first target frequency. The resonance frequency of the first cavity 302 is based on the volume of the first cavity 302 and/or the diameter and length of the third duct 210. The length represents a length of the third set of ducts 210 from the first cavity 302 to the surface of the front panel 202. The resonance frequency of the first cavity 302 is proportional to an area (e.g., diameter) of the third ducts 210 over the volume of the first cavity 302 and the length of the third ducts 210.

For example, the volume of the first cavity 302 is configured to be 12 m$^3$. The diameter of the third set of ducts 210 for the first cavity 302 is configured to be 133 mm, and the length is configured to be 0.2 mm. Based on the volume and the size of the third set of ducts 210, the first cavity 302 has a resonance frequency of approximately 280 Hz.

The configured first cavity 302 and the third set of ducts 210 form the pressure pulsation waveform 401. For example, the configured first cavity 302 and corresponding third set of ducts 210 have the resonance frequency at the target frequency at the pressure peak 410. The pressure pulsation waveform 401 includes a pressure peak 408 at the target frequency. The configured first cavity 302 dampened an amplitude of the pressure peak 410 at ranges about the target frequencies. For example, the pressure peak 410 is reduced by a value 414 to from the pressure peak 408.

Figure 5:
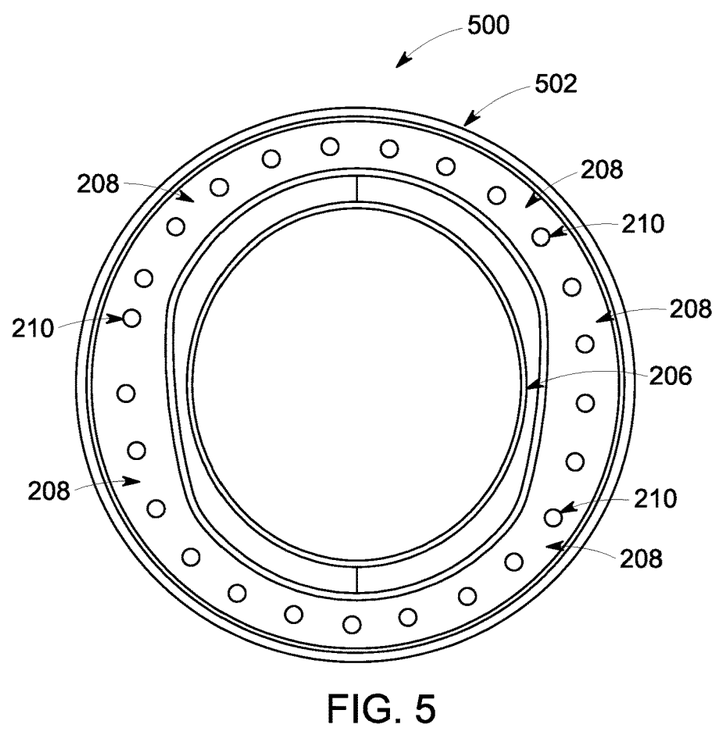
FIG. 5 illustrates a perspective view of an embodiment of a dome.

FIG. 5 illustrates a perspective view of a dome 500, in accordance with an embodiment. The dome 500 includes the aperture 206 configured to surround the injector assembly 212 (not shown in FIG. 5). The dome 500 includes a front panel 502 radially extending from the aperture 206. Similar to the dome 200 (FIG. 2), the dome 500 includes the series of ducts on a surface of the front panel 502. For example, the front panel 502 includes the second and third set of ducts 208, 210.

Figure 6:
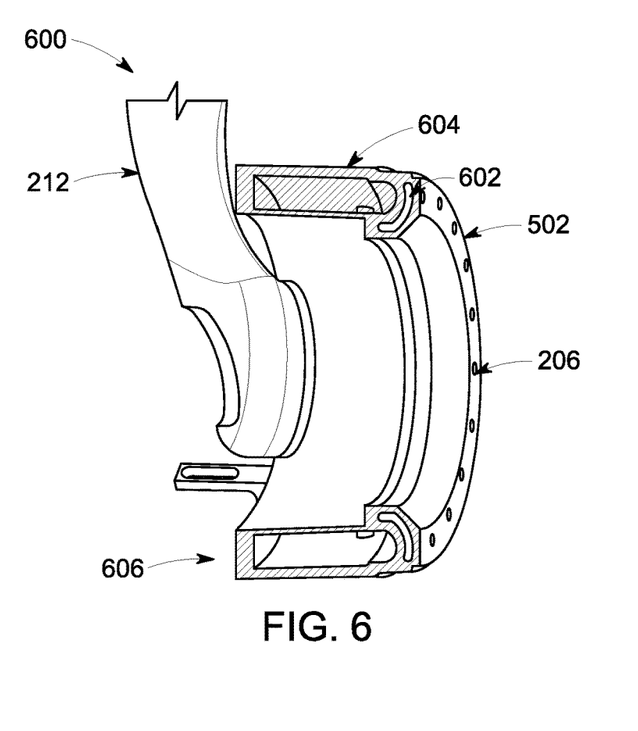
FIG. 6 illustrates a side view of the dome shown in FIG. 5.

FIG. 6 illustrates a side view 600 of the dome 500. The front panel 502 includes first and second cavities 602, 604 along a backside 606 of the front panel 502. The first and second cavities 602, 604 extend along a circumference of the backside 606 of the front panel 502. In connection with FIG. 7, the series of ducts direct airflow from the compressor 118 to the combustor 120.

Figure 7:
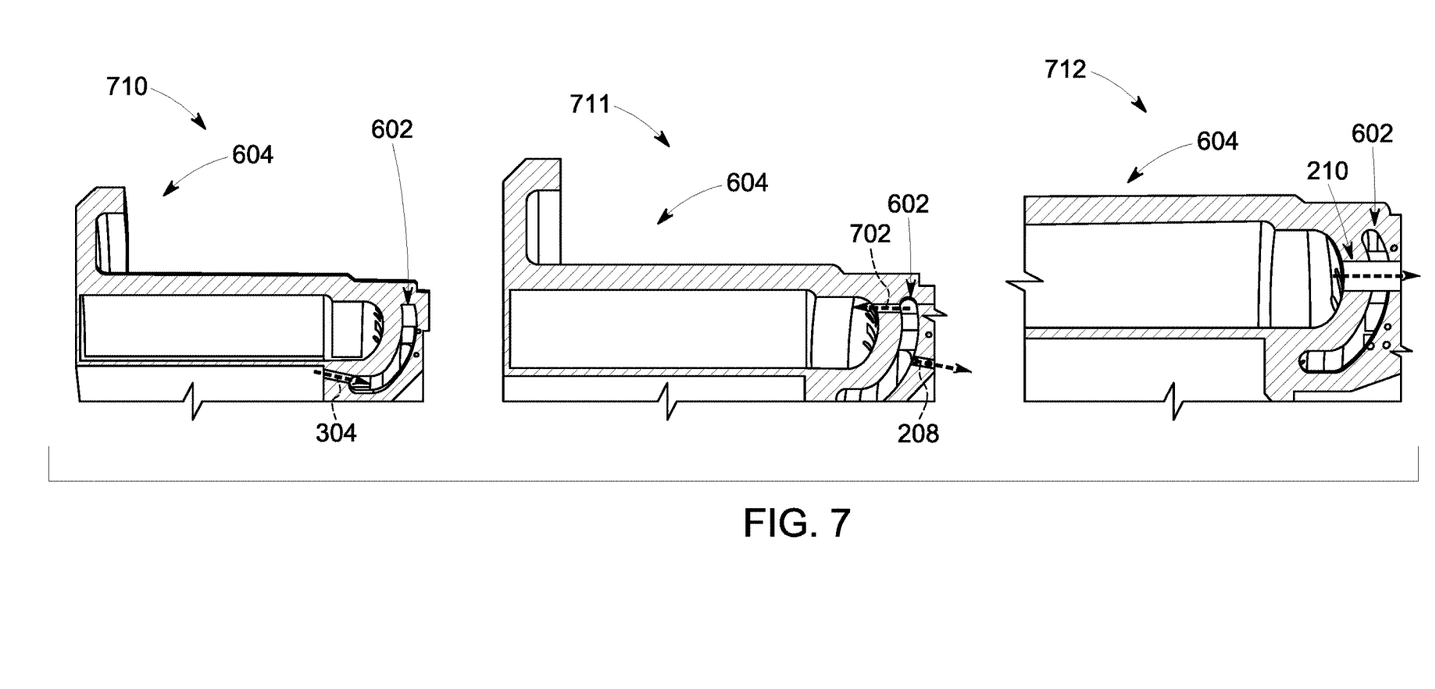
FIG. 7 illustrates airflow of first and second cavities of the dome shown in FIG. 5.

FIG. 7 illustrates airflow of the first and second cavities 602, 604 of the dome 500. At 710, the first cavity 602 receives airflow from the compressor 118. For example, the first cavity 602 includes a first set of ducts 304 of the series of ducts. The first set of ducts 304 are configured to direct airflow from the compressor 118 into the first cavity 602.

At 711, a portion of the received airflow is exhausted through the second set of ducts 208 to the combustor 120. A remaining portion of the received airflow is directed through a receiving duct 702. The receiving duct 702 is configured to direct the remaining portion of the received airflow into the second cavity 604. For example, the remaining portion of the received airflow delivered by the receiving duct 702 creates the air pocket within the second cavity 604. Similar to the first cavity 302, the pocket of air of the second cavity 604 is configured as a damper to suppress the pressure pulsations generated by the compressor 118.

At 712, the second cavity 604 includes the third set of ducts 210. The third set of ducts 210 are configured to direct airflow to the combustor 120 from the second cavity 604. For example, the pocket of air is exhausted from the second cavity 604 through the third set of ducts 210 to the combustor 120.

Figure 8:
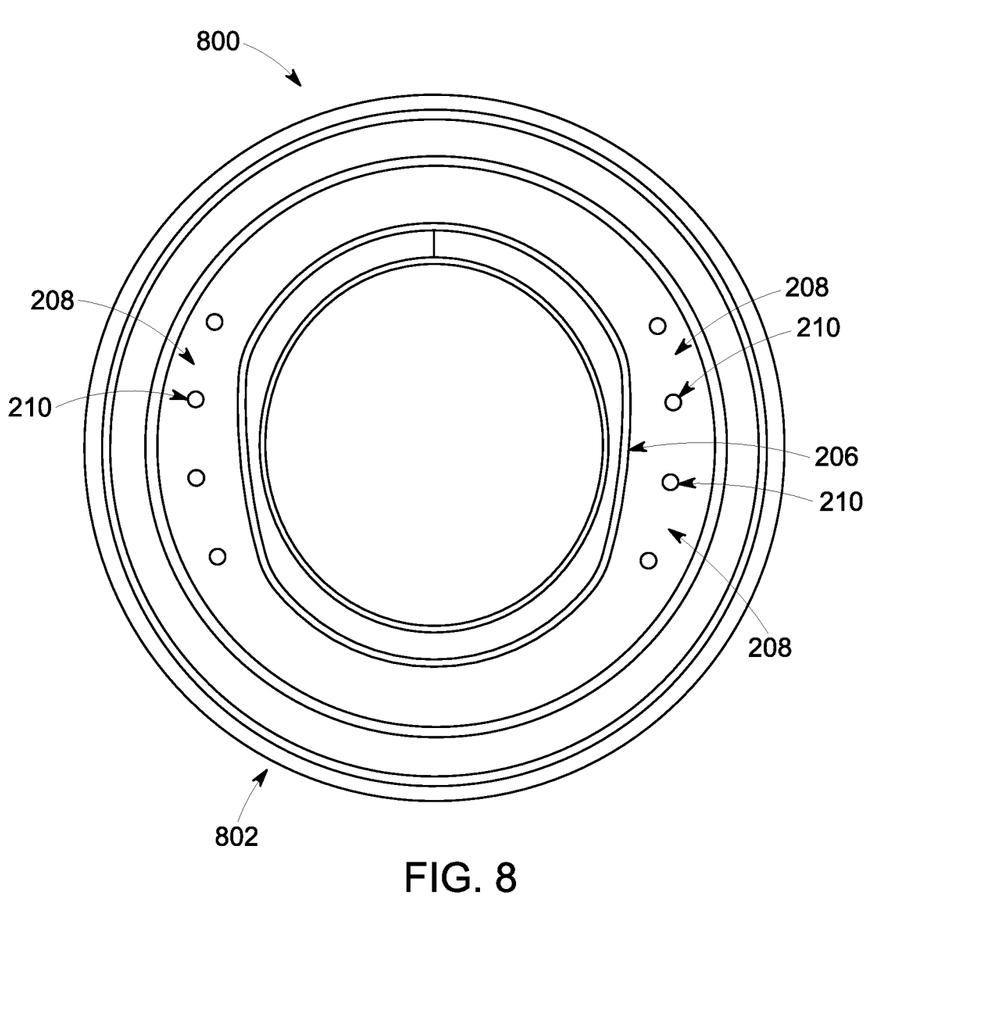
FIG. 8 illustrate a perspective view of an embodiment of a dome.

FIG. 8 illustrate a perspective view of an embodiment of a dome 800. The dome 800 includes the aperture 206 and the front panel 802. The aperture 206 is configured to surround the injector assembly (not shown). The front panel 802 includes the series of ducts. For example, the front panel 802 includes the second set of ducts 208 on the surface of the front panel 802. The second set of ducts 208 are positioned along a circumference of the surface of the front panel 802. Additionally or alternatively, the third set of ducts 210 are positioned along a portion of the circumference of the front panel 802. For example, the third set of ducts 210 are positioned with respect to cavities (e.g., first and second cavities 902, 904 in FIGS. 9A-B) that are positioned at a backside 906 of the dome 800.

Figure 9A:
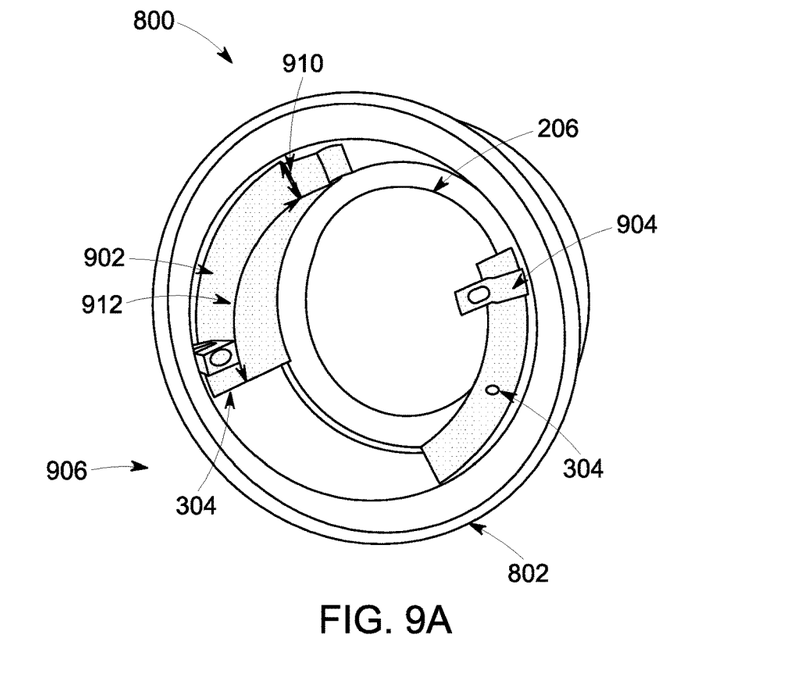
FIGS. 9A-B illustrate a backside and a translucent view of the dome shown in FIG. 8.
Figure 9B:
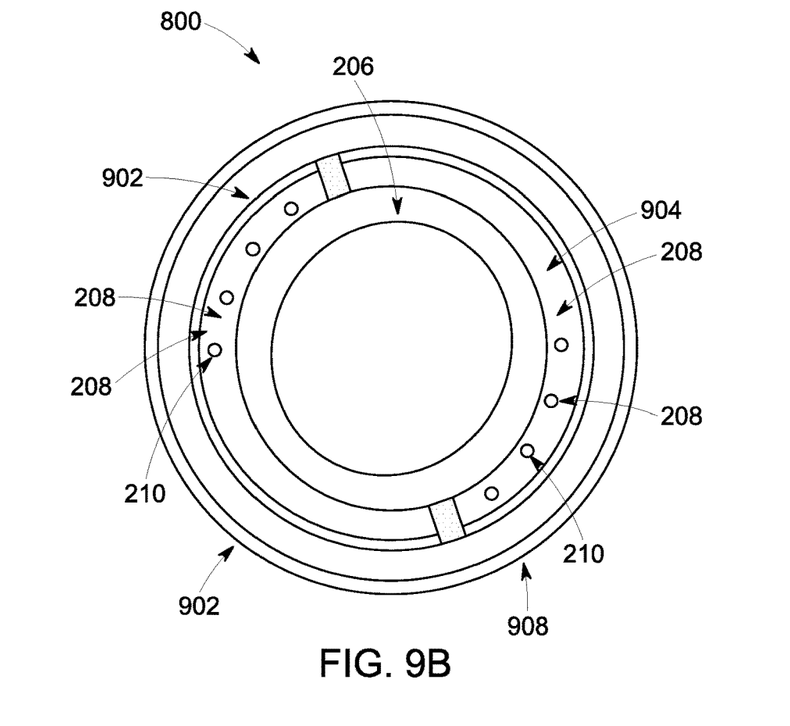

FIGS. 9A-B illustrate the backside 906 and a translucent view 908 of the dome 800. The front panel 802 includes the first and second cavities 902, 904. The first and second cavities 902, 904 are discrete cavity volumes having a radial length 912 and width 910. For example, the first and second cavities 902, 904 extend along different portions of the circumference of the backside 906 of the dome 800. The first and second cavities 902, 904 are positioned at different radial positions on the backside 906 of the front panel 802. The translucent view 908 illustrates the radial positions of the first and second cavities 902, 904 with respect to the third set of ducts 210. For example, the third set of ducts 210 are located at the corresponding first and second cavities 902, 904. The first and second cavities 902, 904 are stationary. For example, the first and second cavities 902, 904 are configured to be stationary with respect to the third set of ducts 210. Additionally or alternatively, a portion of the second set of ducts 208 are positioned within the corresponding first and second cavities 902, 904.

The first and second cavities 902, 904 include the first set of ducts 304. The first set of ducts 304 can be positioned at different locations of the first and second cavities 902, 904. For example, the first set of ducts 304 are positioned at a bottom position of the first cavity 902. In another example, the first set of ducts 304 are positioned at a backside of the second cavity 904. Optionally, the first set of ducts 304 may be positioned along the inner radius of the first and/or second cavities 902, 904 proximate to the aperture 206. The first set of ducts 304 are configured to direct airflow from the compressor 118 into the first and second cavities 902, 904. A portion of the received airflow is exhausted through the second set of ducts 208 to the combustor 120. A remaining portion of the received airflow remains within the first and second cavities 902, 904 forming the pocket of air. The pocket of air is dispersed from the first and second cavities 902, 904 through corresponding third set of ducts 210 to the combustor 120.

Optionally, volumes of the first and second cavities 902, 904 and/or the size of the set of third ducts 210 are configured for particular target frequencies. In connection with FIG. 4, the first and second cavities 902, 904 and/or the size of the set of third ducts 210 can be configured for different target frequencies. The pressure spectrum 402 includes two pressure peaks 410, 412. The pressure peaks 410, 412 occur at target frequencies indicative of a resonance of the combustor 120. For example only, a first target frequency is proximate to 861 Hz, and a second target frequency is proximate to 1140 Hz.

The dome 800 can be configured to reduce an amplitude of the pressure peaks 410, 412. For example, the first and second cavities 902, 904 can be configured to have resonance frequencies to match the first and second target frequencies of the pressure spectrum 402. A volume of the first cavity 902 and/or the size of the set of third ducts 210 of the first cavity 902 can be configured to have a resonance frequency at the first target frequency. The resonance frequency of the first cavity 902 is based on the volume of the first cavity 902 and/or the diameter and length of the third duct 210. The length represents a length of the third set of ducts 210 from the first cavity 902 to the surface of the front panel 802. The resonance frequency of the first cavity 902 is proportional to an area (e.g., diameter) of the third ducts 210 over the volume of the first cavity 902 and the length of the third ducts 210.

The configured first and second cavities 902, 904 and the third set of ducts 210 form the pressure pulsation waveform 404. For example, the configured first cavity 902 and corresponding third set of ducts 210 have the resonance frequency at the first target frequency, and the configured second cavity 904 and corresponding third set of ducts 210 have the resonance frequency at the second target frequency. The pressure pulsation waveform 404 includes pressure peaks 408, 406 at the first and second target frequencies. The configured first cavity 902 dampened an amplitude of the pressure peak 410 at ranges about the target frequencies. For example, the pressure peak 410 is reduced by a value 414 to from the pressure peak 408. The configured second cavity 904 dampened an amplitude of the pressure peak 412 at ranges about the target frequencies. In another example, the pressure peak 412 is reduced by a value 416 to form the pressure peak 406.

Optionally, the dome 800 may include only the first cavity 902 and/or both the first and second cavities 902, 904 are configured to have a common resonance frequency.

Figure 10:
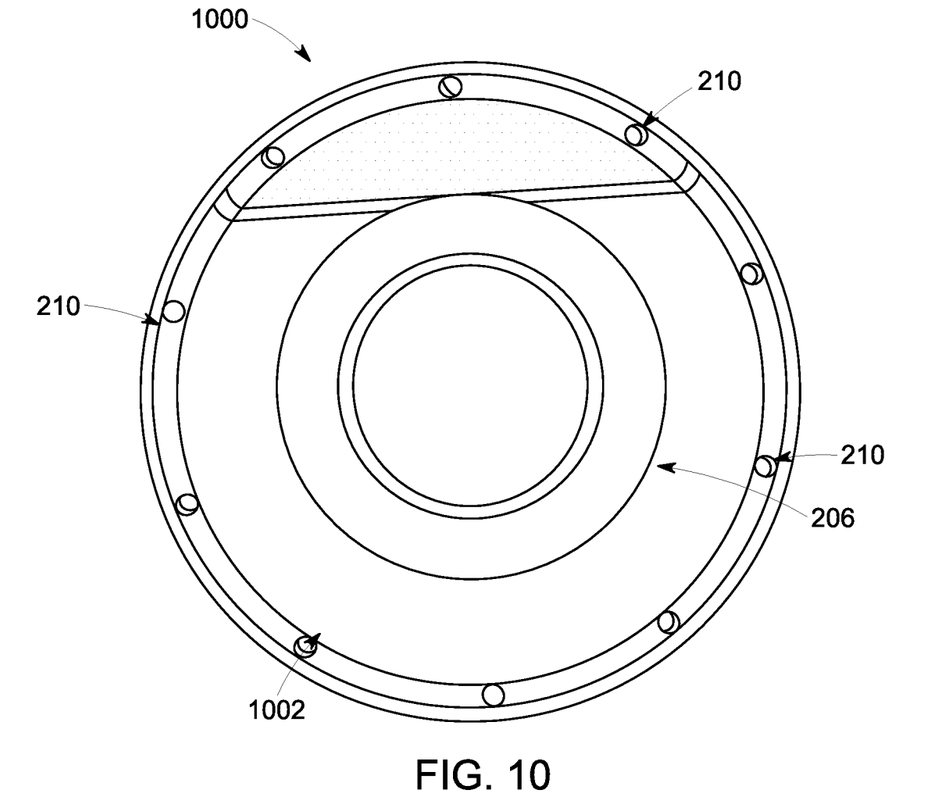
FIG. 10 illustrates a perspective view of an embodiment of a dome.

FIG. 10 illustrates a perspective view of an embodiment of a dome 1000. The dome 1000 includes the aperture 206 and a front panel 1002. The aperture 206 is configured to surround the injector assembly (not shown). The front panel 1002 includes the third set of ducts 210 on the surface of the front panel 1002. The third set of ducts 210 are positioned along a circumference of the front panel 1002. The second set of ducts 208 are positioned behind a lip 1108 of the front panel 1002 as shown in FIG. 11.

Figure 11:
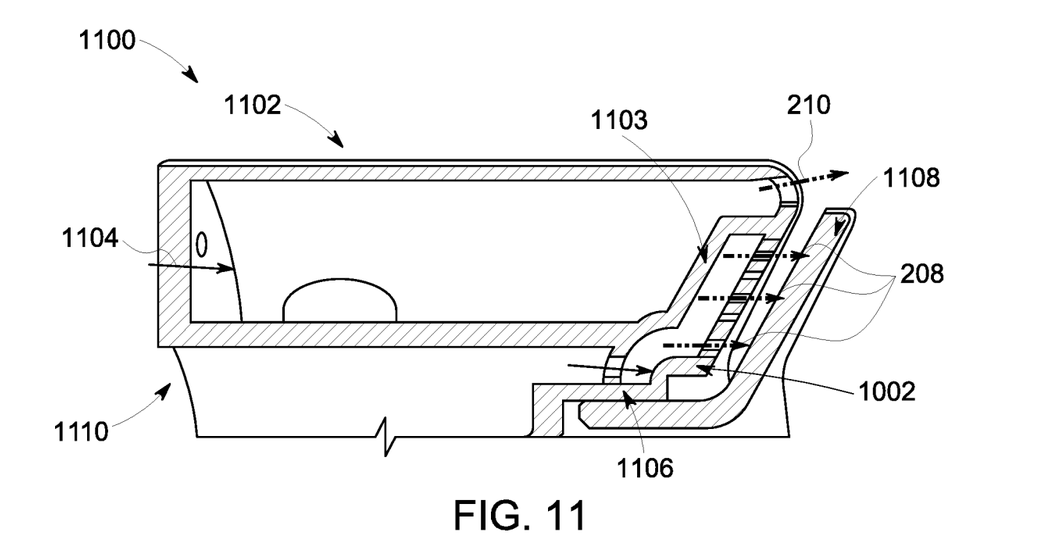
FIG. 11 illustrates a side view of first and second cavities of the dome shown in FIG. 10.

FIG. 11 illustrates a side view 1100 of first and second cavities 1102, 1103 of the dome shown 1000. The first and second cavities 1102, 1103 extend along a circumference of a backside 1110 of the front panel 1002. The first cavity 1102 includes the third set of ducts 210 and fourth set of ducts 1104. The fourth set of ducts 1104 are configured to direct received airflow from the compressor 118 into the first cavity 1102. The received airflow from the fourth set of ducts 1104 form the pocket of air within the first cavity 1102. For example, the pocket of air is configured to dampen or suppress the pressure pulsations generated by the compressor 118. The pocket of air within the first cavity 1102 acts as a cushion, which absorbs the pressure pulsations generated by the compressor 118.

The second cavity 1103 includes a first set of ducts 1106 configured to direct received airflow from the compressor 118 into the second cavity 1103. The second set of ducts 208 are configured to direct the received airflow to reduce a thermal temperature of the dome 1000. For example, the second set of ducts 208 are configured to direct the received airflow to a hot side of the dome 200 via the lip 1108. The lip 1108 of the front panel 1002 is angled to direct the airflow of the second set of ducts 208 away from the aperture 206 to the combustor 120.

Figure 12:
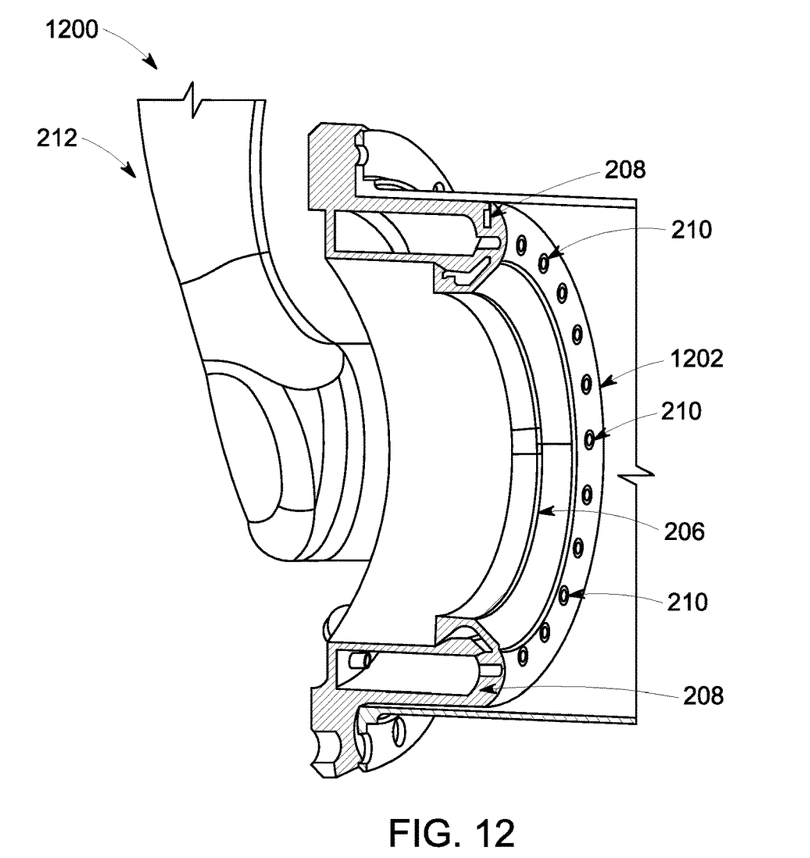
FIG. 12 illustrates a perspective view of an embodiment of a dome.

FIG. 12 illustrates a perspective view of an embodiment of a dome 1200. The dome 1200 includes the aperture 206 configured to surround the injector assembly 212, which extends through the aperture 206. The dome 1200 includes a front panel 1202 radially extending from the aperture 206. The dome 1200 includes a series of ducts on a surface of the front panel 1202. For example, the front panel 1202 includes the second and third set of ducts 208, 210.

Figure 13:
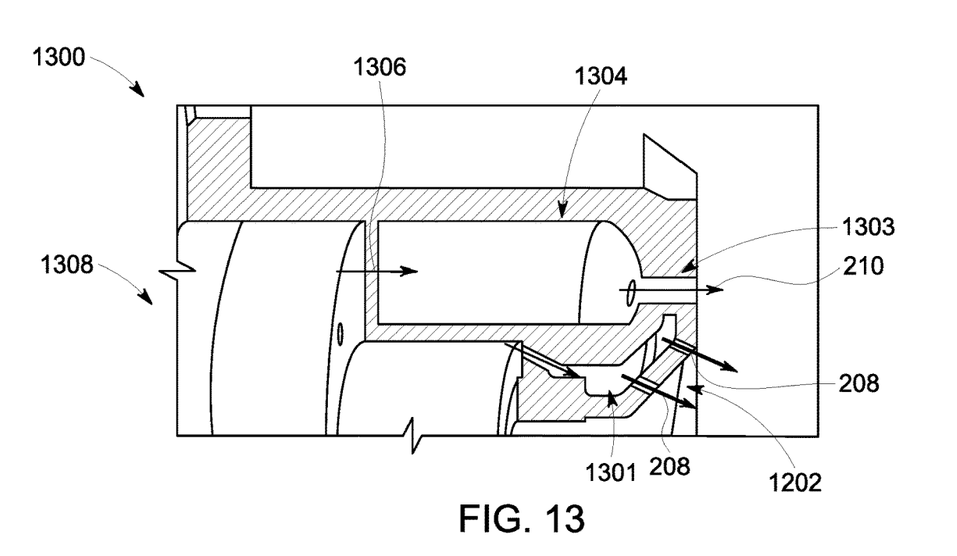
FIG. 13 illustrates a side view of first and second cavities of the dome shown in FIG. 12.

FIG. 13 illustrates a side view 1300 of first and second cavities 1302, 1304 of the dome 1200. The front panel 1202 includes the first and second cavities 1302, 1304 along a backside 1408 of the front panel 1202. The first and second cavities 1302, 1304 extend along a circumference of a backside 1308 of the front panel 1202.

The first cavity 1302 includes a first set of ducts 1301 of the series of ducts. The first set of ducts 1301 are configured to direct airflow from the compressor 118 into the first cavity 1302. The received airflow is exhausted through the second set of ducts 208 to the combustor 120.

The second cavity 1304 includes a fourth set of ducts 1306 positioned at the backside 1308 of the front panel 1202. The fourth set of ducts 1306 is configured to receive airflow from the compressor 118. The second cavity 1304 is configured to provide the pocket of air to dampen or suppress the pressure pulsations generated by the combustor 120. The second cavity 1304 includes the third set of ducts 210. The third set of ducts 210 are configured to direct airflow to the combustor 120 from the second cavity 1404. For example, the pocket of air is dispersed from the second cavity 1304 through the third set of ducts 210 to the combustor 120.

Figure 14:
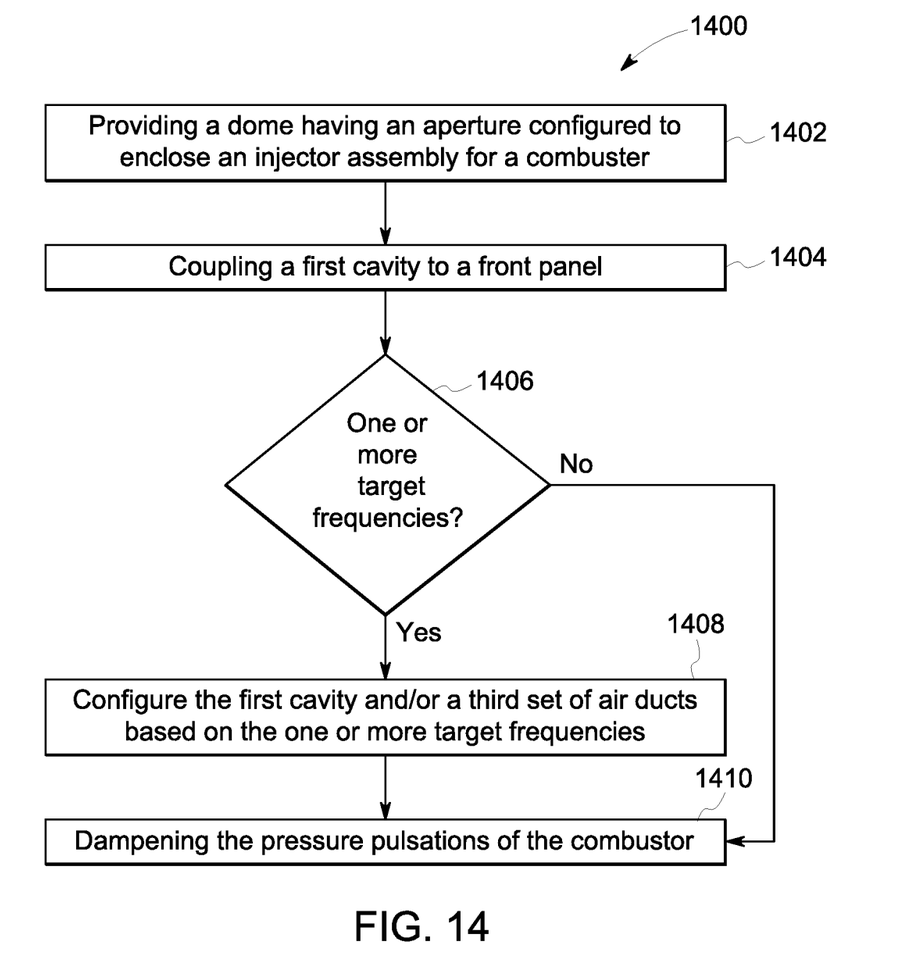
FIG. 14 illustrates a flowchart of a method for suppressing pressure pulsations of a gas turbine assembly, in accordance with an embodiment.

FIG. 14 illustrates a flowchart of a method 1400 for suppressing pressure pulsations of the gas turbine assembly 100, in accordance with an embodiment. The method 1400, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1400 may be used as one or more algorithms to direct hardware to perform one or more operations described herein. Optionally, the method 1400 may be utilized to retrofit a conventional gas turbine assembly. For example, the method 1400 is used to replace an existing dome of the conventional gas turbine assembly.

Beginning at 1402, providing a dome (e.g., the dome 200, 400, 500, 1100, 1300) having the aperture 206 to surround the injector assembly 204 for the combustor 120. For example, the dome 200 includes the aperture 206, which is configured to surround the injector assembly 204. The dome 200 includes the front panel 202 extending radially from the aperture 206.

At 1404, coupling a first cavity to a front panel. For example, the first cavity 302 is coupled to the front panel 202 of the dome 200. The first cavity 302 includes the series of ducts, which included on a surface of the front panel 202. For example, the second and third sets of ducts 208, 210 are positioned radially on the surface of the front panel 202. The first cavity 302 includes a first set of ducts 304 that receive airflow into the first cavity 302 from the compressor 118. The first cavity 302 includes the second set of ducts 208 configured to direct a portion of the airflow to the combustor 120. The portion of the airflow directed by the second set of ducts 208 are configured to reduce the thermal temperature of the dome 302. For example, the second set of ducts 208 are configured to direct the portion of the received airflow to a hot side of the dome 200. The hot side of the dome 200 may correspond to a portion of the dome 200 proximate to the combustor 120. The remaining portion of the airflow enters into the first cavity 302 forming the air pocket. The air pocket is configured to provide a cushion, which is utilized to dampen and/or suppress the pressure pulsations generated by the combustor 120. The first cavity 302 includes the third set of ducts 210. The third set of ducts 210 are configured to direct exhaust the air pocket from the first cavity 302 to the combustor 120. For example, the third set of ducts 210 is configured to direct airflow to the combustor 120 from the first cavity 302.

At 1406, if one or more target frequencies are present. For example, the one or more target frequencies are indicative of resonance frequencies of the combustor 120. In connection with FIG. 4, the one or more target frequencies represent pressure peaks 410, 412 of the pressure pulsation waveform 402. The one or more target frequencies correspond to frequencies that include the pressure peaks 410, 412.

If there are one or more target frequencies, then at 1408, the first cavity and/or the third set of ducts are configured based on the one or more target frequencies. For example, the first and second cavities 902, 904 (FIG. 9A-B) and the corresponding size of the third set of ducts 210 can be configured based on the one or more target frequencies. The volumes of the first and second cavities 902, 904 of the dome 800 and the corresponding size of the third set of ducts 210 can be configured such that the resonance frequency of the first and second cavities match the one or more target frequencies. The resonance frequency of the first and second cavities 902, 904 are based on the volume of the cavities 902, 904 and/or the size of the third set of ducts 210.

At 1410, dampening the pressure pulsations of the combustor 120. For example, the first cavity 302 contains a pocket of air provided by the first set of ducts 306. The pocket of air of the second cavity 604 is configured as a damper to suppress the pressure pulsations generated by the compressor 118.

In an embodiment, a system (e.g., gas turbine assembly) is provided. The system includes a dome having an aperture configured to surround an injector assembly for a combustor. The dome having a front panel radially extending from the aperture, and have a first cavity that includes a series of ducts. A first duct of the series of ducts is configured to receive airflow into the first cavity from a compressor, and a second set of ducts of the series of ducts and a third duct of the series of ducts are configured to direct airflow to the combustor from the first cavity. The third duct having a larger diameter than the second set of ducts.

Optionally, the first cavity extends along a circumference of a backside of the front panel.

Optionally, the first cavity extends along a portion of a circumference of a backside of the front panel. Additionally or alternatively, a volume of the first cavity and the diameter of the third duct are based on a target frequency indicative of a resonance. Additionally or alternatively, the dome includes a second cavity extending along a portion of a circumference of a backside of the front panel. The second cavity further having the first duct, the second sets of ducts, and the third duct. A volume of the first cavity is based on a first target frequency and a volume of the second cavity is based on a second target frequency.

Optionally, the second set of ducts are configured to direct an airflow to reduce a thermal temperature of the dome.

Optionally, the first cavity is configured to adjust an amount of air pressure delivered to the combustor.

In an embodiment, a method (e.g., for suppressing pressure pulsations of a gas turbine assembly) is provided. The method includes providing a dome having an aperture configured to surround an injector assembly for a combustor. The dome having a front panel extending radially from the aperture. The method includes coupling a first cavity to the front panel. The first cavity includes a series of ducts. A first duct is configured to receive airflow into the first cavity from the compressor. And a second set of ducts that are configured to direct an airflow to reduce a thermal temperature of the dome.

Optionally, the first cavity includes a third duct configured to direct airflow to the combustor from the first cavity. The third duct has a diameter larger than the second set of ducts.

Optionally, the first cavity extends along a circumference of a backside of the front panel.

Optionally, the first cavity extends along a portion of a circumference of a backside of the front panel.

Optionally, the method includes adjusting a volume of the first cavity and the diameter of the third duct based on a target frequency indicative of a resonance.

Optionally, the second set of ducts are positioned about the third duct.

Optionally, the method includes coupling a second cavity to the first cavity. The second cavity having a third duct configured to receive airflow into the second cavity from the compressor and a fourth duct configured to direct airflow to a combustor. The fourth duct has a diameter larger than the second set of ducts. Additionally or alternatively, the third duct interconnects the first and second cavities and is configured to direct airflow from the first cavity to the second cavity. Additionally or alternatively, the front panel is angled to direct the airflow of the second set of ducts and the fourth duct away from the aperture.

In an embodiment, a system (e.g., gas turbine assembly) is provided. The system includes a front panel radially extending from an aperture that surrounds an injector assembly of the gas turbine assembly. The front panel having first and second cavities with the first cavity having a first set of ducts configured to receive airflow into the first cavity from the compressor. A second set of ducts configured to direct airflow to a combustor. The second cavity having a third duct configured to receive airflow into the second cavity and a fourth duct configured to direct airflow to a combustor. The fourth duct having a diameter larger than the second set of ducts.

Optionally, the third duct interconnects the first and second cavities and is configured to direct airflow from the first cavity to the second cavity. Additionally or alternatively, the second set of ducts are positioned about the fourth duct. Additionally or alternatively, the front panel includes is angled to direct the airflow of the second set of ducts and the fourth duct away from the aperture.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A dome assembly of a gas turbine assembly, the dome assembly comprising:
   a front panel defining a downstream wall of a first cavity and a second cavity, wherein the first cavity is between a portion of the second cavity and the front panel, the front panel radially extending from an aperture that surrounds an injector assembly of the gas turbine assembly, the first cavity and the second cavity extending along a circumference of a backside of the front panel with the first cavity having a first set of ducts configured to receive airflow into the first cavity from a compressor and a second set of ducts configured to direct airflow to a combustor by first impinging on a lip attached to the front panel, the lip defining a gap between the front panel and the lip, the lip being angled to direct the airflow from the first cavity away from the aperture, the second cavity having a third duct configured to receive airflow into the second cavity from the compressor and a fourth duct radially outward from the second set of ducts and configured to direct airflow from the second cavity to the combustor, wherein the airflow from the second cavity bypasses the lip after exiting the fourth duct, and wherein the fourth duct has a diameter larger than that of each duct of the second set of ducts.

2. A dome assembly of a gas turbine assembly, the dome assembly comprising:
   a front panel defining a downstream wall of a first cavity and a second cavity, wherein the second cavity is between a portion of the first cavity and the front panel, the front panel radially extending from an aperture that surrounds an injector assembly of the gas turbine assembly, the first cavity and the second cavity extending along a circumference of a backside of the front panel;
   a first set of ducts configured to direct airflow from a compressor of the gas turbine assembly into the first cavity;
   a second set of ducts configured to direct airflow from the first cavity to a combustor of the gas turbine assembly;
   a third set of ducts configured to direct airflow from the compressor into the second cavity; and a fourth set of ducts configured to direct airflow from the second cavity to reduce a thermal temperature of the dome assembly by impinging on a lip attached to the front panel, the lip defining a gap between the front panel and the lip, the lip being angled to direct the airflow from the second cavity away from the aperture, the fourth set of ducts being radially inward from the second set of ducts, wherein the airflow from the first cavity bypasses the lip after exiting the second set of ducts.

3. The dome assembly of claim 2, wherein the fourth set of ducts are configured to direct airflow from the second cavity to a portion of the front panel proximate the combustor.

4. The dome assembly of claim 2, wherein a diameter of each of the second set of ducts is larger than a diameter of each of the fourth set of ducts.

5. The dome assembly of claim 2, wherein the second set of ducts is arranged circumferentially around the fourth set of ducts.

6. The dome assembly of claim 2, wherein a resonance frequency of the first cavity matches a resonance frequency of the combustor.

7. The dome assembly of claim 2, wherein a resonance frequency of the first cavity and the second set of ducts matches a resonance frequency of the combustor.

8. The dome assembly of claim 2, wherein the first cavity and the second set of ducts are configured to form a pressure pulsation waveform that includes a pressure peak at a target frequency indicative of a resonance of the combustor of the gas turbine assembly.

9. A gas turbine assembly, comprising:
a compressor;
a combustor; and
a dome assembly according to claim 2 between the compressor and the combustor.

10. A dome assembly of a gas turbine assembly, the dome assembly comprising:
a front panel defining a downstream wall of a first cavity and a second cavity, wherein the second cavity is between a portion of the first cavity and the front panel, the front panel radially extending from an aperture that surrounds an injector assembly of the gas turbine assembly;
a first set of ducts configured to direct airflow from a compressor of the gas turbine assembly directly into the first cavity;
a second set of ducts configured to direct airflow from the first cavity to a combustor of the gas turbine assembly;
a third set of ducts configured to direct airflow from the compressor directly into the second cavity; and
a fourth set of ducts configured to direct airflow from the second cavity to impinge on a lip attached to the front panel, the lip defining a gap between the front panel and the lip, the lip being angled to direct the airflow from the second cavity away from the aperture, the fourth set of ducts being radially inward from the second set of ducts,
wherein the airflow from the first cavity bypasses the lip after exiting the second set of ducts.

11. The dome assembly of claim 10, wherein the second set of ducts is arranged circumferentially around the fourth set of ducts and a diameter of each of the second set of ducts is larger than a diameter of each of the fourth set of ducts.

12. The dome assembly of claim 10, wherein a resonance frequency of the first cavity and/or the second set of ducts matches a resonance frequency of the combustor.

13. The dome assembly of claim 10, wherein the first cavity and the second set of ducts are configured to form a pressure pulsation waveform that includes a pressure peak at a target frequency indicative of a resonance of the combustor of the gas turbine assembly.

14. A gas turbine assembly, comprising:
a compressor;
a combustor; and
a dome assembly according to claim 10 between the compressor and the combustor.

* * * * *